(12) United States Patent
Zhang et al.

(10) Patent No.: US 12,296,631 B2
(45) Date of Patent: May 13, 2025

(54) STEEL CORD FOR RUBBER REINFORCEMENT

(71) Applicant: NV BEKAERT SA, Zwevegem (BE)

(72) Inventors: Aijun Zhang, Jiangyin (CN); Haidong Xi, Jiangyin (CN); Wei Zhou, Jiangyin (CN)

(73) Assignee: NV BEKAERT SA, Zwevegem (BE)

( * ) Notice: Subject to any disclaimer, the term of this patent is extended or adjusted under 35 U.S.C. 154(b) by 587 days.

(21) Appl. No.: 17/425,590

(22) PCT Filed: Feb. 18, 2020

(86) PCT No.: PCT/EP2020/054218
§ 371 (c)(1),
(2) Date: Jul. 23, 2021

(87) PCT Pub. No.: WO2020/173759
PCT Pub. Date: Sep. 3, 2020

(65) Prior Publication Data
US 2022/0097454 A1 Mar. 31, 2022

(30) Foreign Application Priority Data
Feb. 26, 2019 (CN) .......................... 201910143498.X

(51) Int. Cl.
*B60C 9/00* (2006.01)
*D02G 3/12* (2006.01)
(Continued)

(52) U.S. Cl.
CPC ............. *B60C 9/0007* (2013.01); *D02G 3/12* (2013.01); *D02G 3/48* (2013.01); *D07B 1/062* (2013.01);
(Continued)

(58) Field of Classification Search
CPC . D02G 3/48; D02G 3/12; D07B 1/062; D07B 2201/2023; D07B 2201/2029;
(Continued)

(56) References Cited

U.S. PATENT DOCUMENTS 5,561,974 A * 10/1996 Yamanaka ........... D07B 1/0633
57/902
5,616,197 A 4/1997 Helfer et al.
(Continued)

FOREIGN PATENT DOCUMENTS

EP 1 381 730 1/2004
EP 2 639 082 9/2013
(Continued)

OTHER PUBLICATIONS

Machine translation JP2008150757 (Year: 2008).*
(Continued)

*Primary Examiner* — Uyen T Nguyen
(74) *Attorney, Agent, or Firm* — Wenderoth, Lind & Ponack, L.L.P.

(57) ABSTRACT

A steel cord with a construction of m+n having a first group of core filaments having a number of m and a second group of sheath filaments having a number of n, the second group and the first group are twisted around each other with the same twist pitch and same twist direction, wherein the core filaments are not twisted with each other, the core filaments are parallel or have a twist pitch being more than 300 mm, and the sheath filaments have a twist pitch being less than or equal to 30 mm, the core filaments have an average tensile strength Tc in MPa when being un-ravelled from said steel cord, the sheath filaments have an average tensile strength Ts in MPa when being un-ravelled from said steel cord, Tc and Ts satisfy: 5<(Tc−Ts)<200. The steel cord has high breaking load and high production efficiency without cost increase.

7 Claims, 1 Drawing Sheet

Figure 1:
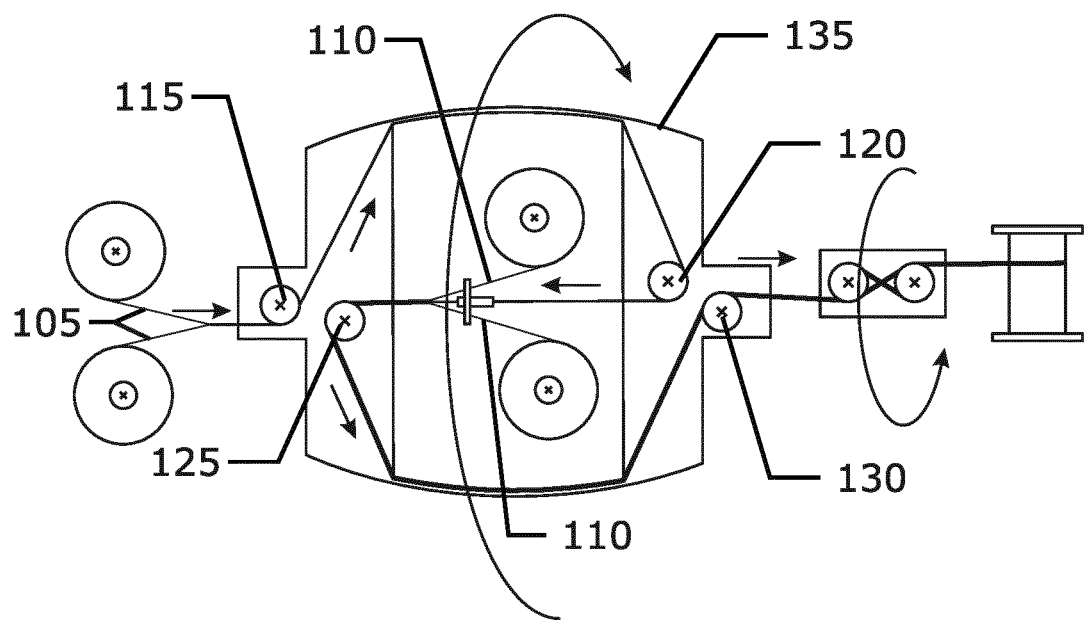

(51) Int. Cl.
*D02G 3/48* (2006.01)
*D07B 1/06* (2006.01)

(52) U.S. Cl.
CPC ............. *B60C 2009/0085* (2013.01); *B60C 2009/0092* (2013.01); *D07B 2201/2023* (2013.01); *D07B 2201/2029* (2013.01); *D07B 2201/206* (2013.01); *D07B 2201/2066* (2013.01); *D07B 2205/3025* (2013.01); *D07B 2501/2046* (2013.01)

(58) Field of Classification Search
CPC ...... D07B 2201/206; D07B 2201/2066; D07B 2205/3025; D07B 2501/2046
See application file for complete search history.

(56) References Cited

U.S. PATENT DOCUMENTS

| | | | | |
|---|---|---|---|---|
| 6,041,839 A | * | 3/2000 | Susutoglu | B60C 9/2006 152/526 |
| 6,863,103 B1 | * | 3/2005 | Masubuchi | B60C 9/2006 57/902 |
| 2003/0188525 A1 | * | 10/2003 | Kobayashi | D07B 1/0613 57/212 |
| 2004/0166299 A1 | * | 8/2004 | Haislet | B60C 9/005 428/292.1 |
| 2018/0010295 A1 | * | 1/2018 | Okazaki | B60C 9/0007 |

FOREIGN PATENT DOCUMENTS

| | | | |
|---|---|---|---|
| EP | 3 543 399 | 9/2019 | |
| JP | 06-306784 | 11/1994 | |
| JP | 09-156314 | 6/1997 | |
| JP | 2008150757 A | * 7/2008 | ........... D07B 1/0613 |
| JP | 2012-171367 | 9/2012 | |
| WO | 02/088459 | 11/2002 | |
| WO | 2018/092534 | 5/2018 | |

OTHER PUBLICATIONS

"Polygonally Preformed Steel Elements", Research Disclosure, Kenneth Mason Publications, Hampshire, UK, GB, No. 363, Jul. 1, 1994, pp. 359-365.

International Search Report and Written Opinion of the International Searching Authority issued Apr. 29, 2020, in International (PCT) Application No. PCT/EP2020/054218.

* cited by examiner

STEEL CORD FOR RUBBER REINFORCEMENT

TECHNICAL FIELD

The invention relates to a steel cord for rubber reinforcement. The invention also relates to a rubber article reinforced by such steel cord.

BACKGROUND ART

Steel cord is widely used for reinforcing rubber article, like tire, hose, conveyor belt and etc., since steel cord can provide the sufficient strength and flexibility to a rubber article.

Recently green tire is a trend as it is lighter and can save more energy. As a reinforcement of the tire, steel cord consisting of steel filaments with high tensile strength is developed accordingly, since the high tensile strength of steel filament can bring sufficient breaking load with thinner steel filament diameter, and thereby the diameter and weight of the steel cord are decreased. The use of the thinner and lighter steel cords makes the tire being thinner and lighter too.

However the steel filaments with high tensile strength is difficult to be processed like being twisted to be a steel cord, since the higher tensile strength leads to higher fracture problem during processing.

U.S. Pat. No. 5,616,197 discloses a truck tire reinforced by a U+T type steel cord. The steel filaments with super tensile strength and the special designed belt structure make the tire having a reduced weight.

U+T type steel cord wherein the U filaments are untwisted and parallel and T filaments are twisted as a group with the U filaments with the same lay length and twist direction. However in steel cord production this type steel cord has high steel filament fracture ratio during the production, and this leads to low production efficiency.

DISCLOSURE OF INVENTION

The primary object of the invention is to solve the above mentioned problem.

The second object of the invention is to provide a steel cord with high breaking load and high production efficiency without cost increase.

The third object of the invention is to provide a tire reinforced by the steel cord with high breaking load and high production efficiency without cost increase.

According to the invention a steel cord with a construction of m+n is provided. The steel cord comprises a first group of core filaments having a number of m and a second group of sheath filaments having a number of n, the second group and the first group are twisted around each other with the same twist pitch and same twist direction, wherein the core filaments are not twisted with each other, the core filaments are parallel or have a twist pitch being more than 300 mm, and the sheath filaments have a twist pitch being less than or equal to 30 mm, the core filaments have an average tensile strength Tc in MPa when being un-ravelled from said steel cord, the sheath filaments have an average tensile strength Ts in MPa when being un-ravelled from said steel cord, Tc and Ts satisfy: $5<(Tc-Ts)<200$.

The invention steel cord has high production efficiency with low steel filament fracture ratio during the steel cord production while the steel cord breaking load is maintained and the cost of steel cord is not increased.

For making a m+n steel cord wherein the core filaments are untwisted with each other, and the core filaments are parallel or have a twist pitch being more than 300 mm, the number of the twisting on the core filaments is more than the number of the twisting on the sheath filaments, since the core filaments are put outside of the cradle of the bunching machine while the sheath filaments are put inside the cradle of the bunching machine. Therefore the core filaments are easier to break than the sheath filaments. Particularly when the tensile strength of the core filaments are super tensile, i.e. above $4100-2000\times D$ MPa, the core filaments break more. The invention solves the steel filament fracture problem by making the tensile strength of the core filaments being a little bit higher than the sheath filaments, in the meantime the breaking load of the steel cord is kept without cost increasing. The higher tensile strength of the core filaments can resist to the higher torsional shear stress that is generated from so many times of twisting, and this makes the breaking of the core filaments being reduced in the steel cord production. However if the difference between the Tc and Ts is too high, i.e. higher than 200 MPa, this will lead to extra production cost, since such higher tensile strength is mainly obtained by increasing the carbon content of the steel filament or adjusting the composition of the steel filament which leads to higher cost, and this is not the expectation of the inventor. On the other hand, a too high tensile strength difference between the core filaments and the sheath filaments, i.e. higher than 200 MPa, will lead to higher fracture during the cord processing as mentioned in above.

When observing the core filaments after the sheath filaments are cut off, either of the two observations reflects that the core filaments are not twisted with each other: 1) there is no overlap between any two core filaments, in this case the core filaments are deemed to be parallel; 2) the twist pitch of the core filaments are measured to be more than 300 mm according to GBT33159-2016.

Preferably, the sheath filaments have a twist pitch being in the range of 5-30 mm.

Preferably, Tc and Ts satisfy: $10<(Tc-Ts)<100$. More preferably, $10<(Tc-Ts)<150$. Most preferably, $10<(Tc-Ts)<100$ or even $15<(Tc-Ts)<60$.

Preferably, the steel filaments including the core filaments and the sheath filaments have the same steel composition.

The tensile strength of the core filament or the sheath filament is preferably not too high, since the very high tensile strength will lead to lower ductility and more filament fracture. Preferably, $3800-2000\times Dc<Tc<4300-2000\times Dc$, Dc being the average diameter of the core filaments. Preferably, $3800-2000\times Ds<Ts<4300-2000\times Ds$, Ds being the average diameter of the sheath filaments.

All the filaments of the steel cord including the core filaments and the sheath filaments have the uniform diameter. Because of the accuracy of the production, the diameter of each filament either the core filament or the sheath filament cannot be absolutely the same as the others, thus the invention defines that Dc is substantially equal to Ds, and "substantially equal" means the difference between Dc and Ds is within the +/−0.005 mm, and in this case it is deemed that all the filaments of the steel cord have the uniform diameter. During the twisting process for forming a steel cord, the steel cord bears a high tension, if the core filament diameter is higher than the sheath filament diameter, the tension distribution becomes un-uniform, and the core filaments bear more tension, and this makes the core filaments being quite easy to break, and this is not desired. Therefore, for the present invention the core filament diameter is the same as the sheath filament diameter.

Preferably m is larger than n. More preferably m is 3 or 4. This construction has a better rubber penetration performance.

According to a third aspect of the invention a tire is provided. A tire comprises the belt layer, the carcass layer, the tread layer and a pair of bead portions, the belt layer and/or the carcass layer is embedded with at least one invention steel cord.

BRIEF DESCRIPTION OF FIGURES IN THE DRAWINGS

Figure 2:
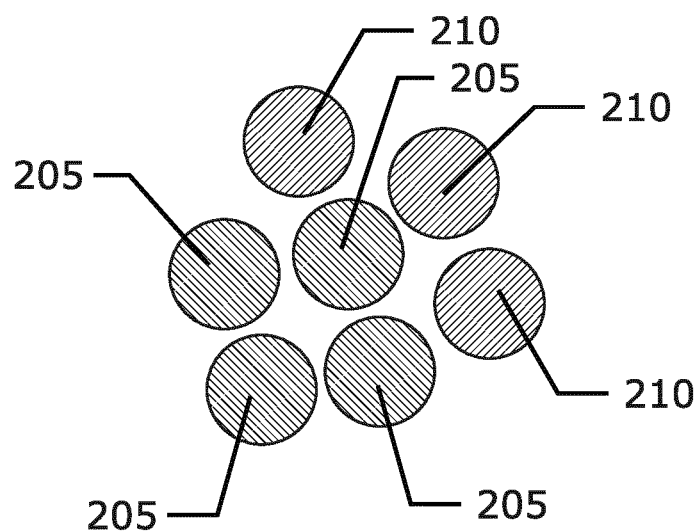

FIG. 1 shows a process of making m+n steel cord.
FIG. 2 shows the first embodiment of 4+3 steel cord.

MODE(S) FOR CARRYING OUT THE INVENTION

The steel filaments for steel cord are made from a wire rod.

The wire rod is firstly cleaned by mechanical descaling and/or by chemical pickling in a $H_2SO_4$ or HCl solution in order to remove the oxides present on the surface. The wire rod is then rinsed in water and is dried. The dried wire rod is then subjected to a first series of dry drawing operations in order to reduce the diameter until a first intermediate diameter.

At this first intermediate diameter D1, e.g. at about 3.0 to 3.5 mm, the dry drawn steel wire is subjected to a first intermediate heat treatment, called patenting. Patenting means first austenitizing until a temperature of about 1000° C. followed by a transformation phase from austenite to pearlite at a temperature of about 600-650° C. The steel wire is then ready for further mechanical deformation.

Thereafter the steel wire is further dry drawn from the first intermediate diameter D1 until a second intermediate diameter D2 in a second number of diameter reduction steps. The second diameter D2 typically ranges from 1.0 mm to 2.5 mm.

At this second intermediate diameter D2, the steel wire is subjected to a second patenting treatment, i.e. austenitizing again at a temperature of about 1000° C. and thereafter quenching at a temperature of 600 to 650° C. to allow for transformation to pearlite.

If the total reduction in the first and second dry drawing step is not too big a direct drawing operation can be done from wire rod till diameter D2.

After this second patenting treatment the steel wire is usually provided with a brass coating: copper is plated on the steel wire and zinc is plated on the copper. A thermo-diffusion treatment is applied to form the brass coating. Alternatively, the steel wire can be provided with a ternary alloy coating, including copper, zinc and a third metal of cobalt, titanium, nickel, iron or other known metal.

The brass-coated steel wire is then subjected to a final series of cross-section reductions by means of wet drawing machines. The final product is a steel wire with a carbon content above 0.60 percent by weight, e.g. higher than 0.70 percent by weight, or higher than 0.80 percent by weight, or even higher than 0.90 percent by weight, with a tensile strength typically above 2000 MPa, e.g. above 3800–2000×D (HT) Mpa, or above 4100–2000×D MPa (ST) or above 4400-2000×D (UT) MPa (D is the diameter of the final steel wire, i.e. D is Dc or Ds) and adapted for the reinforcement of elastomer products.

Steel wires adapted for the reinforcement of tyres typically have a final diameter ranging from 0.05 mm to 0.60 mm, e.g. from 0.10 mm to 0.40 mm. Examples of wire diameters are 0.10 mm, 0.12 mm, 0.15 mm, 0.175 mm, 0.18 mm, 0.20 mm, 0.22 mm, 0.245 mm, 0.28 mm, 0.30 mm, 0.32 mm, 0.35 mm, 0.38 mm, 0.40 mm.

FIG. 1 shows the process of making a m+n steel cord. The steel cord is made by the bunching type machine. Two core filaments 105 are put outside of cradle 135 of the bunching machine and two sheath filaments 110 are put inside the cradle 135 of the bunching machine. First the two core filaments 105 are paid off and guided to pass through the pulley 115 and the pulley 120, after that the two core filaments form a strand; the two sheath filaments 110 are paid off, and then the two sheath filaments 110 as a group are twisted with the strand of the two core filaments 105 at the pulley 125 and the pulley 130 to form a cord, then the cord is subjected to a false-twister and then is taken up on a spool. The second group of sheath filaments and the first group of core filaments are twisted around each other with the same twist pitch and same twist direction, wherein the core filaments are not twisted with each other, the core filaments are parallel or have a twist pitch being more than 300 mm, the sheath filaments have a twist pitch being less than or equal to 30 mm. During the bunching process, the core filaments are subjected to four times twisting including the twice twisting in S direction at pulley 115 and pulley 120 and the twice twisting in Z direction at pulley 125 and pulley 130; wherein the sheath filaments are subjected to twice twisting including twisting in Z direction at pulley 125 and pulley 130. The core filaments are subjected to two times twisting more than the sheath filaments, and further the core filaments are subjected to the twisting in different directions, i.e. twist-in (S direction) and twist-out (Z direction), therefore the core filaments are easier to break than the sheath filaments in the steel cord production. The invention solves the problem. The invention makes the core filaments having a tensile strength a little bit higher than the sheath filaments to reduce the steel filament fracture ratio in the steel cord production, while the steel cord cost is not increased. This is realized by adjusting the drawing process of filament making process mentioned in above, i.e. adjusting the compression ratio of the drawing die, i.e. wet wire drawing.

FIG. 2 shows the first embodiment. The steel cord has 4+3 construction consisting of four core filaments 205 and three sheath filaments 210. The four core filaments 205 are parallel with each other. The sheath filaments 210 have a twist pitch of 18 mm.

TABLE 1

|  | First embodiment | Reference 1 | Reference 2 | Reference 3 |
|---|---|---|---|---|
| Construction | 4 + 3 | 4 + 3 | 4 + 3 | 4 + 3 |
| Dc (mm) | 0.35 | 0.35 | 0.35 | 0.35 |
| Ds (mm) | 0.35 | 0.35 | 0.35 | 0.35 |
| Tc (MPa) | 3306 | 3547 | 3110 | 3271 |
| Ts (MPa) | 3268 | 3269 | 3260 | 3270 |
| Tc − Ts | 38 | 278 | −150 | 1 |
| Cord breaking load (N) | 2212 | 2285 | 2135 | 2200 |
| Core filament fracture ratio (times/ton) | 3 | 32 | 1 | 13 |

The first embodiment and the reference 1-3 are made by the method as the same as the process shown in FIG. 1. Reference 1 has high core filament fracture ratio and high production cost since the tensile strength of the core filaments is very high. Reference 2 reduces the filament fracture ratio by decreasing the tensile strength of the core filaments, however the breaking load of the steel cord is also much reduced. Reference 3 has the similar tensile strength between the core filaments and the sheath filaments, but it has high core filament fracture ratio.

From the above table, the invention cord has a low core filament fracture ratio while keeping a high cord breaking load. The small increase on the Tc can help to reduce the steel filament fracture during the steel cord production while keeping the steel cord breaking load without significant cost increasing.

The method of testing and calculating the average tensile strength Tc and Ts includes:
  Unravel the core filaments and sheath filaments from the steel cord,
  Calculate the tensile strength of individual filament by dividing the filament breaking load by the filament cross-sectional area, the filament breaking load is measured according to the principle mentioned in the standard ISO6892-1:2009 with some particular setting like the clamp length being 250 mm and the test speed being 100 mm/min, test 5 times for each filament,
  Calculate the average tensile strength of the core filaments and the average tensile strength of the sheath filaments to obtain Tc and Ts.

The average diameter of core filaments and the average diameter of sheath filaments are tested in the following way:
  Unravel the core filaments and sheath filaments from the steel cord,
  Measure the diameter of individual filament by micrometer, test 5 times for each filament,
  Calculate the average diameter of the core filaments and the average diameter of the sheath filaments to obtain Dc and Ds.

Core filament fracture ratio is measured by calculating the ratio of the times of core filament fracture to the production ton of steel cord.

The second embodiment is 4+6×0.32. The four core filaments are parallel with each other. The sheath filaments have a twist pitch of 18 mm. The difference between the Tc and Ts is 40 MPa.

The invention claimed is:

1. A steel cord, said steel cord comprising a first group of core filaments having a number of m and a second group of sheath filaments having a number of n, the sheath filaments of said second group and the core filaments of said first group being twisted with each other,
  wherein said core filaments being not twisted with each other, the core filaments being parallel or having a twist pitch being more than 300 mm, said sheath filaments having a twist pitch being less than or equal to 30 mm,
  wherein Dc is substantially equal to Ds, Dc being an average diameter of the core filaments, and Ds being an average diameter of the sheath filaments, Dc and Ds are in the range of 0.10 mm to 0.40 mm, and
  wherein said core filaments have an average tensile strength Tc in MPa when being un-ravelled from said steel cord, said sheath filaments have an average tensile strength Ts in MPa when being un-ravelled from said steel cord, $4100-2000 \times Dc < Tc < 4300-2000 \times Dc$, $4100-2000 \times Ds < Ts < 4300-2000 \times Ds$, said Dc and said Ds being expressed in mm, said Tc and said Ts satisfying:

$$5 < (Tc-Ts) < 200.$$

2. The steel cord as claimed in claim 1, wherein said Tc and said Ts satisfy: $10 < (Tc-Ts) < 150$.

3. The steel cord as claimed in claim 2, wherein said Tc and said Ts satisfy: $10 < (Tc-Ts) < 100$.

4. The steel cord as claimed in claim 2, wherein said Tc and said Ts satisfy: $15 < (Tc-Ts) < 60$.

5. The steel cord as claimed in claim 1, wherein m is larger than n.

6. The steel cord as claimed in claim 1, wherein m is 3 or 4.

7. A tire comprising a belt layer, a carcass layer, a tread layer and a pair of bead portions, wherein said belt layer and/or said carcass layer is embedded with at least one steel cord as claimed in claim 1.

* * * * *